US008000327B1

(12) United States Patent
Minei et al.

(10) Patent No.: US 8,000,327 B1
(45) Date of Patent: Aug. 16, 2011

(54) QUALITY OF SERVICE (QOS)-AWARE FORWARDING IN AN MPLS NETWORK WITH TACTICAL TRAFFIC ENGINEERING

(75) Inventors: Ina Minei, Sunnyvale, CA (US); Nischal Sheth, Los Altos, CA (US); Hannes Gredler, Pillberg (AT)

(73) Assignee: Juniper Networks, Inc., Sunnyvale, CA (US)

( * ) Notice: Subject to any disclaimer, the term of this patent is extended or adjusted under 35 U.S.C. 154(b) by 629 days.

(21) Appl. No.: 11/567,570

(22) Filed: Dec. 6, 2006

Related U.S. Application Data (60) Provisional application No. 60/848,589, filed on Sep. 29, 2006.

(51) Int. Cl.
*H04L 12/56* (2006.01)
(52) U.S. Cl. ........................ 370/392; 370/401
(58) Field of Classification Search .................. 370/392, 370/401, 400, 432, 312, 221, 217
See application file for complete search history.

(56) References Cited

U.S. PATENT DOCUMENTS

| | | | | |
|---|---|---|---|---|
| 6,950,398 | B2 * | 9/2005 | Guo et al. ...................... 370/235 |
| 6,973,057 | B1 | 12/2005 | Forslow | |
| 2004/0095922 | A1 | 5/2004 | Sasagawa | |
| 2004/0223498 | A1 * | 11/2004 | Sanderson et al. ....... 370/395.52 |
| 2005/0220148 | A1 * | 10/2005 | DelRegno et al. ............. 370/498 |
| 2006/0072574 | A1 * | 4/2006 | Akahane et al. .............. 370/392 |
| 2006/0083251 | A1 | 4/2006 | Kataoka et al. | |
| 2006/0182035 | A1 * | 8/2006 | Vasseur ......................... 370/238 |
| 2007/0271243 | A1 * | 11/2007 | Fan et al. ........................... 707/3 |
| 2009/0141632 | A1 | 6/2009 | Lawrence et al. | |

OTHER PUBLICATIONS

U.S. Appl. No. 11/642,162, filed Dec. 20, 2006, entitled "Service-Specific Forwarding in an LDP-RSVP Hybrid Network," Minei et al.
Office Action from U.S. Appl. No. 11/642,162, mailed Oct. 28, 2009, 30 pp.
Response to Office Action mailed Oct. 28, 2009, from U.S. Appl. No. 11/642,162, filed Jan. 28, 2010, 19 pp.
Response to Final Office Action mailed May 7, 2010, from U.S. Appl. No. 11/642,162, filed May 28, 2010, 11 pp.
Notice of Allowance from U.S. Appl. No. 11/642,162, mailed Jun. 22, 2010, 7 pp.

* cited by examiner

*Primary Examiner* — Dang T Ton
*Assistant Examiner* — Nourali Mansoury
(74) *Attorney, Agent, or Firm* — Shumaker & Sieffert, P.A.

(57) ABSTRACT

A router comprises an interface for receiving packets, wherein the packets include Multiprotocol Label Switching (MPLS) labels having the same label value that corresponds to an MPLS label switched path (LSP), and wherein each of the MPLS packets includes MPLS experimental (EXP) bits defined to identify a class of service to which the respective packet belongs. The router is a transit router along the MPLS LSP, and further includes a control unit that, for each of the packets, accesses forwarding information to determine whether to forward the packet along the LSP or to redirect the packet along a second LSP based on the classes of service specified in the EXP bits. The router receives policies via a user interface, and applies the policies to index into the forwarding information to select a forwarding entry, wherein the index is responsive to the label value in combination with the EXP bits.

22 Claims, 4 Drawing Sheets

POLICIES — 50

| 1 | IF RECEIVED FROM FORWARDING CLASS "VOICE" → LOOK IN VOICE INET TABLE TO SELECT PATH <br><br> IF RECEIVED FROM FORWARDING CLASS "DATA" → LOOK IN DATA INET TABLE TO SELECT PATH |
|---|---|
| ⋮ | ⋮ |
| N | ... |

FIG. 3

FORWARDING INFORMATION — 45

| LABEL | PATH |
|---|---|
| L1 | IF EXP 001 → RSVP LSP 20 <br><br> IF EXP 000 → LDP LSP 19B |
| ⋮ | ⋮ |
| Lm | ... |

QUALITY OF SERVICE (QOS)-AWARE FORWARDING IN AN MPLS NETWORK WITH TACTICAL TRAFFIC ENGINEERING

This application claims the benefit of U.S. Provisional Application No. 60/848,589, filed Sep. 29, 2006, the entire content of which is incorporated herein by reference.

TECHNICAL FIELD

The invention relates to computer networks and, more particularly, engineering traffic within a network.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the network, routers exchange routing information in accordance with a defined routing protocol, such as the Border Gateway Protocol (BGP).

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System-Intermediate System (ISIS) protocol or the Open Shortest Path First (OSPF) protocol. An LSP established using LDP may be referred to as an "LDP LSP", and an LSP established using RSVP-TE may be referred to as an "RSVP LSP."

The term "link" is often used to refer to the physical connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links.

SUMMARY

In general, techniques are described for extending label distribution protocol (LDP) to allow a core router to dynamically build forwarding information that maps Multiprotocol Label Switching (MPLS) labels of incoming packets to different paths in a network depending on classes of service of the packets. Moreover, the techniques provide for service-specific Quality of Service (QoS)-aware traffic engineering so as to allow different services (e.g., voice or data) to easily be directed along specific path.

For example, where the core router is a transit router of an MPLS label switched path (LSP) (i.e., an intermediate router along the MPLS LSP), the router receives a packet having an MPLS packet header containing an additional flag identifying the class of service to which the packet belongs, and determines a next hop to which to forward the packet based on the additional QoS flag using the forwarding information. A set of Experimental (EXP) bits of an MPLS packet header may be designated as a QoS flag to designate the class of service.

Often, a multi-service MPLS network is used to carry traffic associated with more than one service. For example, a single network may be used for carrying both voice and data traffic. The network may use LDP as a signaling protocol in order to take advantage of the equal cost paths available between provider edge routers. Traffic engineering of the LDP LSPs is achieved by manipulating the Interior Gateway Protocol (IGP) metrics. In some cases, it may be undesirable to use a full mesh of Resource Reservation Protocol (RSVP) LSPs in the core. For example, the scale of the RSVP mesh may be a problem. As another example, extensive use of Equal-Cost Multipath Protocol (ECMP) may make it difficult to control how traffic moves when the LSP reroutes. The network may instead deploy tactical RSVP LSPs in some parts of the core only. As a result, some links in the core of the network may have high latency, and may therefore be unsuitable for voice traffic. The techniques described herein allow devices in the network to be configured so that the voice traffic avoids the high latency links.

In contrast, conventional routing techniques assume that forwarding traffic to a next hop via an RSVP LSP is preferred over for forwarding traffic to a normal IP next hop. In other words, using conventional techniques, only the RSVP LSP will be visible in the forwarding plane, and will "overshadow" the LDP LSP such that it is not visible as a potential path. As a result, all types of traffic, including both data traffic and voice traffic, will be forwarded over the same RSVP LSP.

One solution to this problem would be to use a full dual-topology approach, with one topology of LSPs for the voice traffic and one topology for the data traffic. This approach would require that each topology be independent of the other, though some links could exist in both topologies. Separate instances of the routing and signaling protocols would operate within each of the two topologies. Thus, in this approach, separate LDP LSPs could be set up over each of the two topologies. Traffic could therefore be mapped to the appropriate LSP at the edge of the core, with voice traffic being mapped to the LSPs in the voice topology, and data traffic being mapped to the LSPs in the data topology. This solution would require topology-aware IGPs and extensions to LDP throughout the network to make it topology aware.

In contrast, the solution described in further detail herein achieves traffic separation by service type in the core without relying on a dual-topology approach or requiring a full mesh of RSVP LSPs in the core.

In one embodiment, a method comprises receiving packets at a transit router of a Multiprotocol Label Switching (MPLS) label switched path (LSP), wherein the packets include MPLS labels having the same label value that corresponds to the LSP, and wherein each of the MPLS packets includes MPLS Experimental (EXP) bits that have been defined to identify a class of service to which the respective packet belongs. The method further includes for each of the packets, accessing forwarding information to determine whether to forward the packet along the LSP or to redirect the packet along a second LSP based on the classes of service specified in the EXP bits, and forwarding the packets from the transit router to next hops in accordance with the forwarding information.

In a further embodiment, a router comprises an interface for receiving packets, wherein the packets include MPLS labels having the same label value that corresponds to an MPLS LSP, and wherein each of the MPLS packets includes MPLS EXP bits that have been defined to identify a class of service to which the respective packet belongs. The router is a transit router along the MPLS LSP, and further includes a control unit that, for each of the packets, accesses forwarding information to determine whether to forward the packet along the LSP or to redirect the packet along a second LSP based on the classes of service specified in the EXP bits.

In another embodiment, a computer-readable medium comprises instructions for causing a programmable processor to receive packets at an intermediate router positioned along an MPLS LSP, wherein the packets include MPLS labels having the same label value that corresponds to the LSP, and wherein each of the MPLS packets includes MPLS EXP bits that have been defined to identify a class of service to which the respective packet belongs. The instructions further cause the programmable processor to access forwarding information to determine whether the forwarding information includes an entry corresponding to both: (1) the label value corresponding to the MPLS LSP from which the packet was received, and (2) the class of service specified by the EXP bits. When no entry exists, the instructions cause the programmable processor to access routing information maintained by the transit router to select a route for the specified class of service, wherein the route corresponds to a second LSP, dynamically update the forwarding information to include an entry that maps the label value corresponding to the MPLS LSP and the specified class of service to the second LSP. The instructions further cause the programmable processor to forward the packets from the transit router to next hops in accordance with the forwarding information by: (i) forwarding along the LSP a first subset of the packets in which the EXP bits specify a first class of service, and (2) redirecting to the second LSP a second subset of the packets in which the EXP bits specify a second class of service.

The techniques may provide one or more advantages. For example, the techniques provide for service-specific traffic engineering so as to allow different network traffic for different types of services (e.g., voice traffic and data traffic) to easily be directed along specific network paths. Moreover, the techniques provide such features without requiring dual-topologies, i.e., a separate full-mesh topology of LSPs for each type of service. In other words, types of network traffic can locally be directed along particular LSPs without requiring that all of the nodes associated with the LSPs be aware of the different types of traffic being forwarded. In addition, transit nodes along the LSP can utilize the techniques to redirect different types of traffic to different LSPs even though the traffic carries identical label values, i.e., labels associated with the same LSP.

As another example, the techniques may be applied in a multi-vendor environment in which devices from multiple vendors are deployed. In particular, only the ingress device of an RSVP LSP need be configured with policies and the extensions to LDP.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
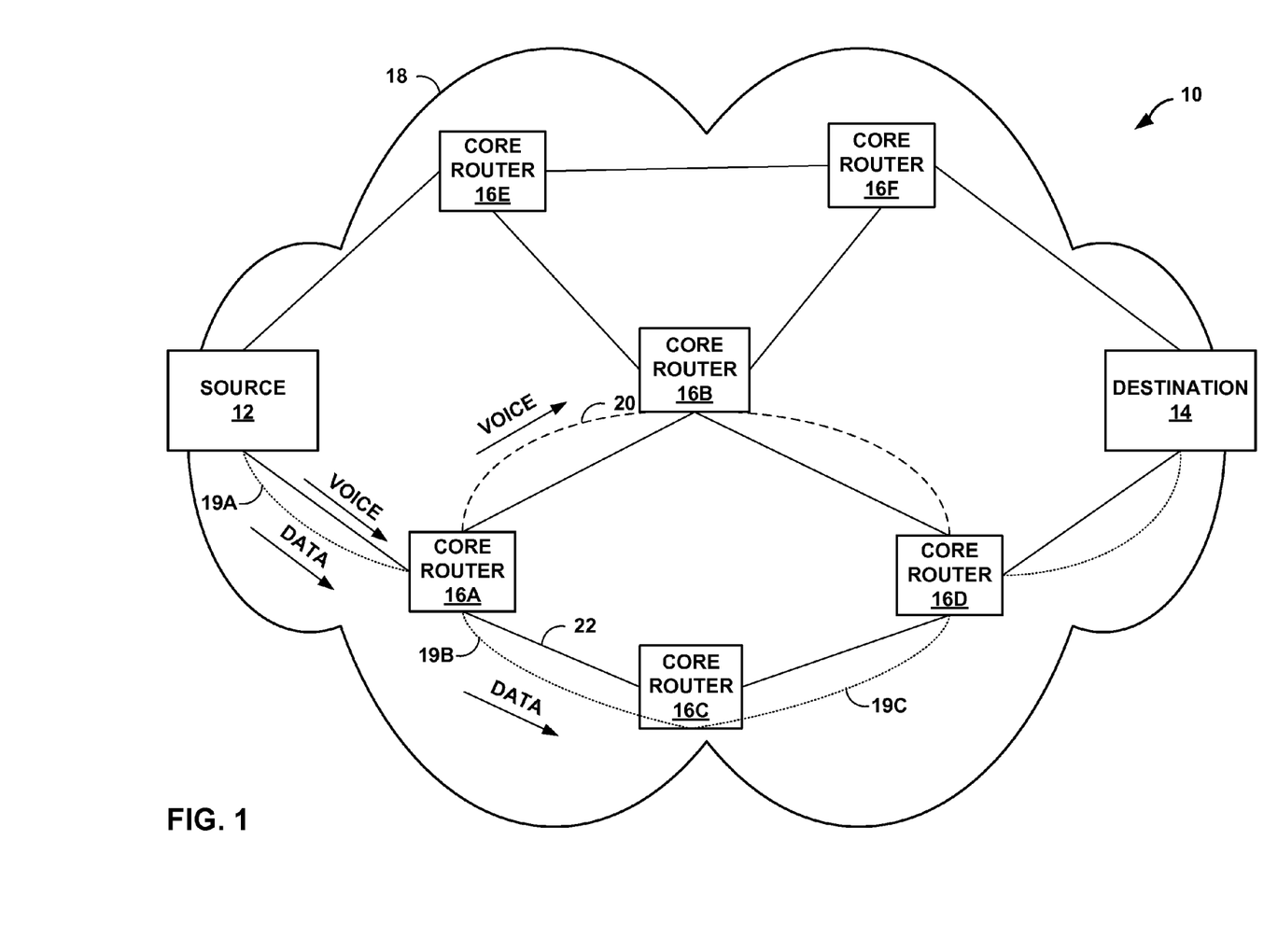
FIG. 1 is a block diagram illustrating an exemplary system having core routers that construct forwarding state to transmit voice traffic and data traffic over different paths through a network.

FIG. 1 is a block diagram illustrating an exemplary system 10 having a source device 12 that sends traffic to a destination device 14 via core routers 16A-16F ("core routers 16") within a network 18. In this example, source device 12 sends both data traffic and voice traffic to destination device 14 by outputting Multiprotocol Label Switching (MPLS) packets having labels identifying a label distribution protocol (LDP) label-switched path (LSP) 19 that consists of LSP segments 19A-19D. Core routers 16 dynamically build indexed forwarding information that allows for forwarding data traffic and voice traffic along different paths through network 18 so that the voice traffic avoids high-latency links, even though the traffic originates from source 12 with MPLS label values corresponding to the same LSP, i.e., LSP 19. For example, core router 16A transmits data traffic to core router 16C over an LDP LSP segment 19B, and transmits voice traffic to core router 16B over Resource Reservation Protocol (RSVP) LSP 20. Network 18 may be a service provider network in which LDP extends to the edge of network 18. That is, most or all of core routers 16 as well as source 12 and destination 14 are LDP-enabled. LDP is a lighter-weight protocol than RSVP. All or portions of the core of network 18 may be traffic-engineered with RSVP, and a full mesh of RSVP LSPs need not be deployed in network 18. For example, RSVP may not extend to the edge of network 18, and source and destination 14 need not be RSVP-enabled. Network 18 may be a multi-vendor environment.

RSVP LSP 20 is set up between core router 16A and core routers 16D. LDP tunneling is enabled for RSVP LSP 20; therefore, LDP packets between routers 16A and 16C are forwarded over RSVP LSP 20 by pushing an RSVP label onto the LDP label and forwarding based on the RSVP label. LDP session 19 is established between core routers 16A and 16D, and LDP labels are exchanged between core routers 16A and 16D. Router 16C need not be part of the LDP signaling. In this way, RSVP LSP 20 may be set up to bypass high latency or congested links, such as link 22. Additional LDP LSP segments (not shown) may be set up between other core routers 16 within network 18. LDP LSP 19 uses pure LDP and traffic engineering based on Interior Gateway Protocol (IGP) metric manipulations. From core router 16A, the preferred path for voice traffic is along the path 16A-16B-16D via RSVP LSP 20, while the preferred path for data traffic is along the path 16A-16C-16D via LDP LSP path segments 19A and 19B.

Traffic belonging to different services, such as voice and data, is marked at the edges of network 18 by setting a flag or other identifier within the MPLS packet header. In one example, this is accomplished with different bit markings within the MPLS Experimental (EXP) bits. In the example of FIG. 1, voice and data traffic arrive at the core of network 18 as MPLS packets along LSPs set up with LDP. For example, voice and data traffic originating from source device 12 arrive at core router 16A having MPLS label values that correspond to LSP 19. Source device 12, e.g., a provider edge router, marks the MPLS packets carrying the traffic along LDP LSP 19 with different EXP values depending on the type of traffic, e.g., voice or data. Source device 12 may determine the appropriate EXP value to set on the packets in a number of ways. For example, source device 12 may determine the type of traffic based on differentiated services code point (DSCP) markings carried by the packets in the IP header. As another example, source device 12 may determine the type of traffic based on the physical interface over which the packet comes in. For example, if the packet comes over interface number 3 and interface number 3 is configured to be connected to the voice gateway, then source device 12 knows the packet is a voice packet. As a further example, a firewall filter of source device 12 may be configured with a rule to look inside the packet for information that identifies the application associated with the packet, such as the port number. As a result, core routers 16 can distinguish between types of services with which the traffic is associated, such as voice packets and data packets.

In one embodiment, an administrator configures core router 16A to include extensions to LDP. The extensions allow LDP to maintain RSVP LSPs in a separate routing information table or other data structure. The administrator also configures core router 16A with policies that define how to dynamically build indexed forwarding information for forwarding different types of traffic along different paths. Extending the LDP protocol allows core router 16A to dynamically build forwarding information that can be used to map MPLS labels of incoming packets for the same LSP to different paths in network 18 depending on classes of service of the packets. Upon receiving a packet containing EXP bits identifying the class of service to which the packet belongs, core router 16A determines a next hop to which to forward the packet based on the EXP bits using the dynamically built forwarding information.

In this manner, forwarding information may be dynamically built to allow for forwarding data traffic and voice traffic along different paths through network 18. The forwarding information is built such that voice traffic is redirected along a different LSP, i.e., RSVP LSP 20, while data traffic continues to traverse LDP LSP 19. As such, a fully-meshed, dual-topology approach need not be implemented. In this example, only core routers 16A, 16B and 16D need support RSVP. Furthermore, only core router 16A need be configured so as to redirect a portion of the traffic for LDP LSP 19 into a different RSVP LSP 20.

Figure 2:
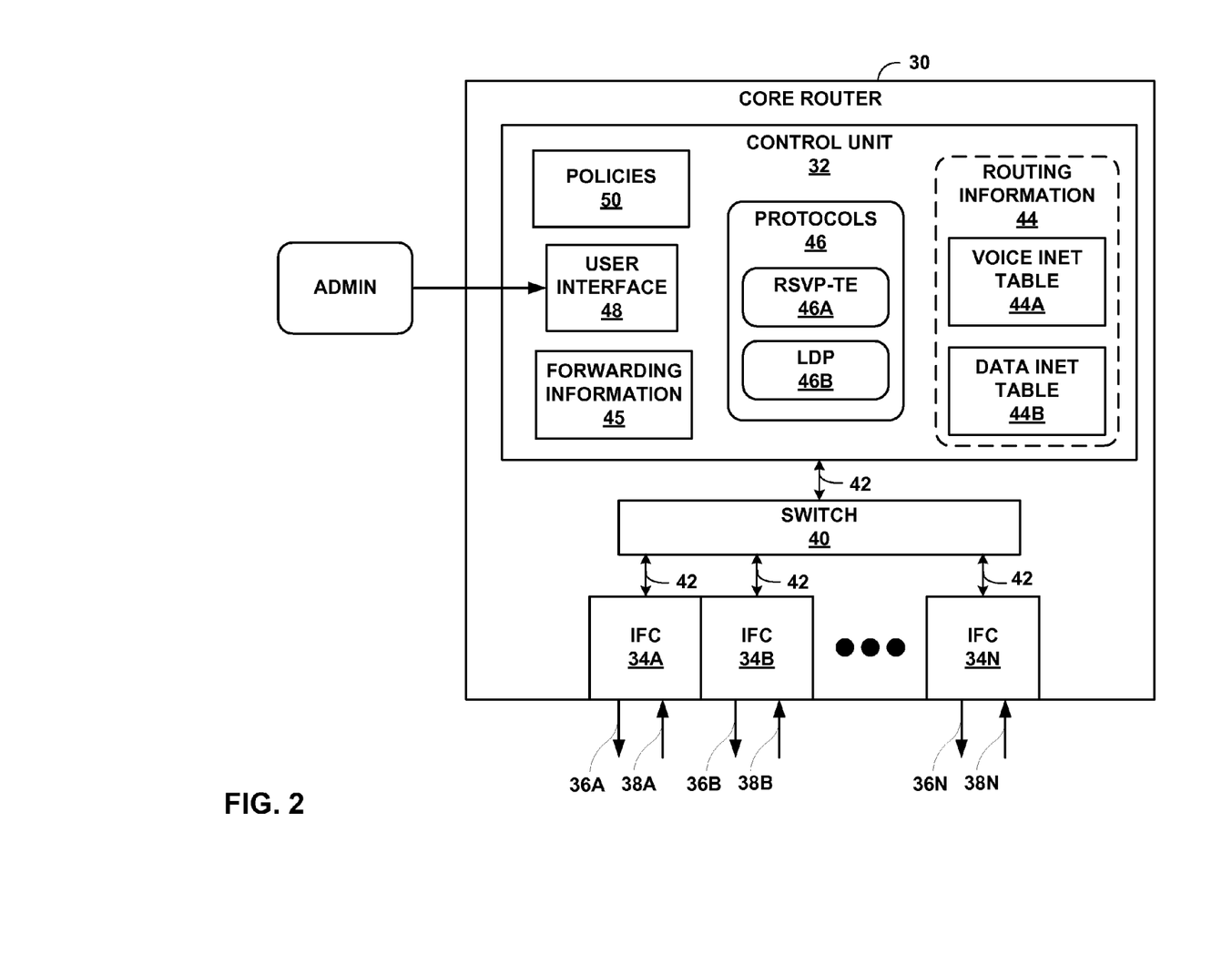
FIG. 2 is a block diagram illustrating, in further detail, an exemplary core router that constructs forwarding state to transmit voice traffic and data traffic over different paths through a network.

FIG. 2 is a block diagram illustrating an exemplary router 30 that transmits voice traffic and data traffic over different paths through network 18 in accordance with the principles of the invention. Router 30 may, for example, represent any of core routers 16 of FIG. 1, such as any of core routers 16A, 16B and 16D that support both RSVP and LDP. Otherwise, router 30 may represent any transit router within an MPLS LSP across network 18, and could also be used as an ingress router of an RSVP LSP that is tactically deployed within network 18.

Router 30 includes a control unit 32 that determines routes of received packets and forwards the packets accordingly. In the exemplary embodiment illustrated in FIG. 3, router 30 includes interface cards (IFCs) 34A-34N (collectively, "IFCs 34") for communicating packets via inbound links 36A-36N ("inbound links 36") and outbound links 38A-38N ("outbound links 38"). IFCs 34 are interconnected by a high-speed switch 40 and links 42. In one example, switch 40 comprises switch fabric, switchgear, a configurable network switch or hub, and the like. Links 42 comprise any form of communication path, such as electrical paths within an integrated circuit, external data busses, optical links, network connections, wireless connections, or other type of communication path. IFCs 34 are coupled to inbound links 36 and outbound links 38 via a number of interface ports (not shown).

Control unit 32 maintains routing information 44 that describes the topology of network 18, and in particular, routes through network 18. Control unit 32 analyzes stored routing information 44 and generates forwarding information 45 for forwarding packets received via inbound links 26 to next hops, i.e., neighboring devices coupled to outbound links 38. Forwarding information 45 may include next hop data indicating appropriate neighboring devices within the network for each of the routes. Router 30 updates routing information 44 to accurately reflect the topology of the network.

Control unit 32 provides an operating environment for protocols 46, which are typically implemented as executable software instructions. As illustrated, protocols 46 include RSVP-TE 46A and LDP 46B. Router 30 uses protocols 46 to set up LSPs. In this example, LDP 46B is programmatically extended to initiate creation of voice inet table data structure 44A, and to update voice inet table 44A to reflect current topology of network 18. Protocols 46 may include other routing protocols in addition to or instead of RSVP-TE 46A and LDP 46B, such as other Multi-protocol Label Switching (MPLS) protocols or routing protocols, such as the Border Gateway Protocol (BGP), interior routing protocols, or other network protocols.

Control unit 32 may maintain routing information 44 as two separate data structures to support the dynamic creation of forwarding information for traffic associated with different services. For example, control unit 32 maintains voice inet table data structure 44A and data inet table data structure 44B. Data structures 44A and 44B may be thought of as subsets of routing information 44. Voice inet table 44A is used to store routes for RSVP LSPs used to carry voice traffic. LDP 46B creates voice inet table 44A by extracting the RSVP LSP routes out of the traditional routing table (i.e., routing information 44 generally) and placing the RSVP LSP routes in a separate table. LDP 46B also installs all LDP routes received over the RSVP-LSP tunnel in voice inet table 44A. Data inet table 44B is used to store routes for LDP LSPs. As a result of maintaining voice inet table 44A and data inet table 44B as separate data structures, the LDP LSP routes of data inet table 44B are now visible to the forwarding functions of router 30, instead of being overshadowed by the low-latency RSVP LSPs, which would otherwise be selected for all traffic using typical route resolution. Voice inet table 44A and data inet table 44B may be separate data structures or may be logically separate within a single data structure of routing information 44. Forwarding information 48 and routing information 44 may be maintained in the form of one or more tables, databases, link lists, radix trees, databases, flat files, or any other data structures.

A system administrator may provide configuration information to router 30 via user interface 48 included within control unit 32. For example, the system administrator may configure router 30 or install software to extend LDP 46B as described herein. As another example, the system administrator may configure policies 50. Policies 50 include policies that trigger the dynamic building of indexed forwarding state in forwarding information 45 based on a class of service. A policy configured by the system administrator in policies 50 may specify that upon receiving packets of a particular forwarding class (e.g., "best effort"), control unit 32 should use a particular subset of routing information 44 (e.g., data inet table 44B), and upon receiving packets of a different forwarding class (e.g., "expedited forwarding"), control unit 32 should use a different subset of routing information 44 (e.g., voice inet table 44A).

In general, router 30 determines which subset of routing information 44 to use in building forwarding information 45 by referencing policies 50 and applying the policies in the forwarding plane. In particular, according to one example policy of policies 50, router 30 uses a route specified by voice inet table 44A for building the next hop when the forwarding class of a received packet is "voice," and uses a route specified by data inet table 44B for building the next hop when the forwarding class of the received packet is "data." The forwarding class of the packets is identified based on EXP bits contained in the received MPLS packets. The EXP bits are set at source device 12, as described above.

When router 30 receives a packet via one of inbound links 36, control unit 32 determines a destination and associated next hop for the packet in accordance with routing information 44 and forwards the packet on one of outbound links 38 to the corresponding next hop in accordance with forwarding information 45 based on the destination of the packet. At this time, control unit 32, or a separate forwarding engine, applies policies 50 to MPLS traffic and, if necessary, dynamically builds forwarding information based on the type of service with which the MPLS traffic is associated as indicated in the MPLS packet header of the traffic. In this manner, forwarding information 45 is dynamically built so that router 30, a transit node within an MPLS LSP across network 18, can forward packets on different paths through network 18 based on the forwarding class of the packets as identified by EXP bits carried by the packets.

The architecture of router 30 illustrated in FIG. 2 is shown for exemplary purposes only. The invention is not limited to this architecture. In other embodiments, router 30 may be configured in a variety of ways. In one embodiment, for example, some of the functionality of control unit 32 may be distributed within IFCs 34. In a further embodiment, control unit 32 may include a routing engine that performs routing functions and maintains a routing information base (RIB), e.g., routing information 44, and a forwarding engine that performs packet forwarding based on a forwarding information base (FIB), e.g., forwarding information 45, generated in accordance with the RIB. Moreover, although described with respect to router 30, the forwarding techniques described herein may be applied to other types of network devices, such as gateways, switches, servers, workstations, or other network devices.

Control unit 32 may be implemented solely in software, or hardware, or may be implemented as a combination of software, hardware, or firmware. For example, control unit 32 may include one or more processors which execute software instructions. In that case, the various software modules of control unit 32 may comprise executable instructions stored on a computer-readable storage medium, such as computer memory or hard disk.

Figure 3:
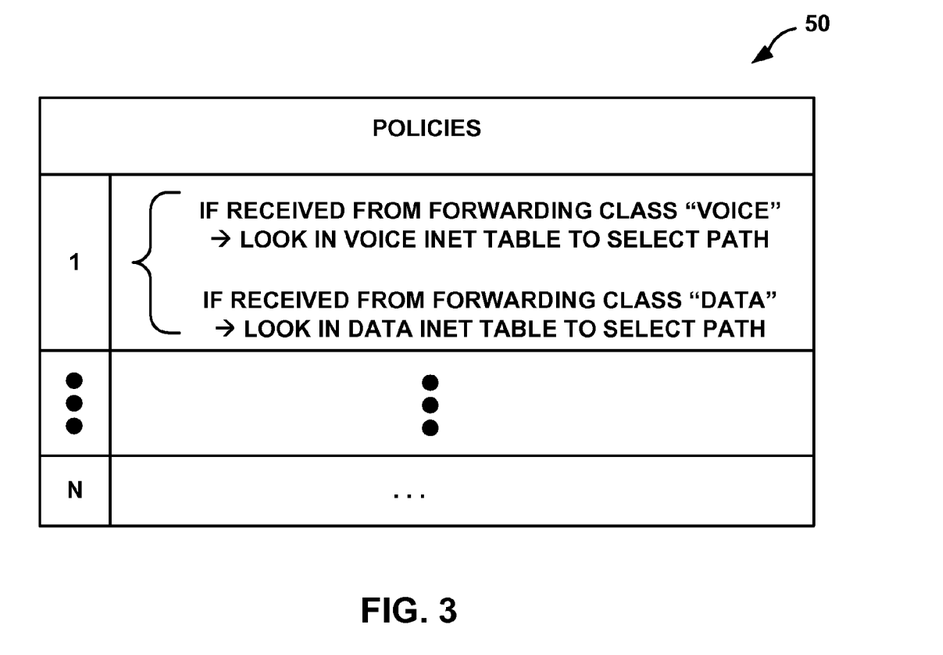
FIG. 3 is a block diagram illustrating an example policies data structure maintained by the core router of FIG. 2.

FIG. 3 is a block diagram illustrating an example policies data structure 50 maintained by router 30 of FIG. 2. Policies data structure 50 includes a list of policies 1-N. Policy 1 instructs control unit 32 that when the forwarding class of a received packet is "voice," control unit 32 should use the route specified by voice inet table 44A for building the next hop. Policy 1 further instructs control unit 32 that when the forwarding class of the received packet is "data," control unit 32 should use a route specified by data inet table 44B for building the next hop. Policies may be installed to policies 50 by an administrator of network 18 or by way of an automated software agent.

Figure 4:
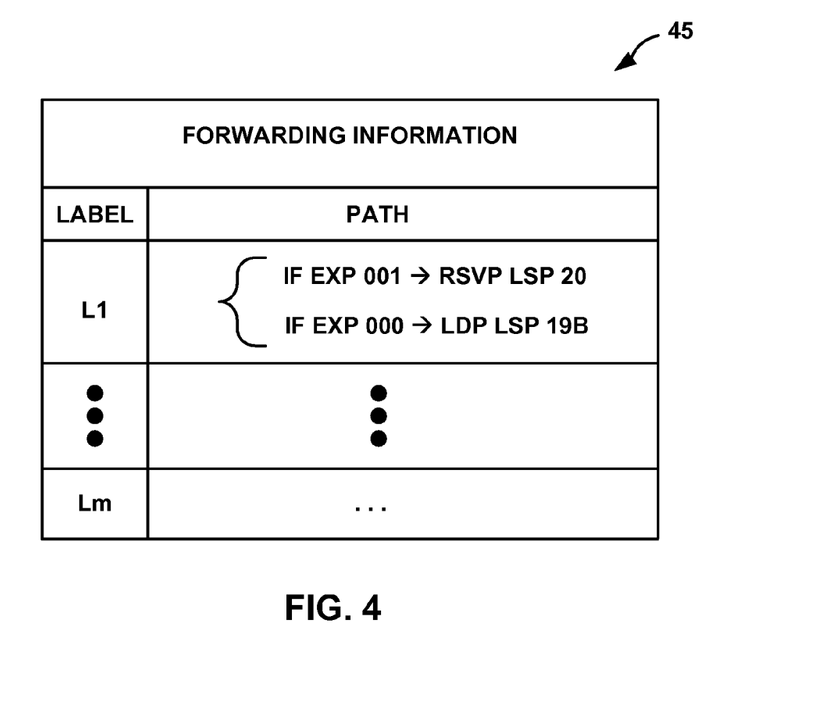
FIG. 4 is a block diagram illustrating an example forwarding information data structure constructed by the core router of FIG. 2.

FIG. 4 is a block diagram illustrating an example forwarding information data structure 45 maintained by router 30 of FIG. 2. Forwarding information 45 includes label values and corresponding next hops to which incoming packets having the label values should be forwarded. Forwarding information 45 is "indexed" based on class of service. In the example of FIG. 4, forwarding information 45 indicates that incoming packets having label value L1 should be forwarded on RSVP LSP 20 if the EXP bits are set to 001, and on LDP LSP 18A if the EXP bit is set to 000. Router 30 dynamically builds indexed forwarding information 45 with reference to policies 50 as applied in the forwarding plane, and selects the next hop based on the EXP bits of the received MPLS packets.

Figure 5:
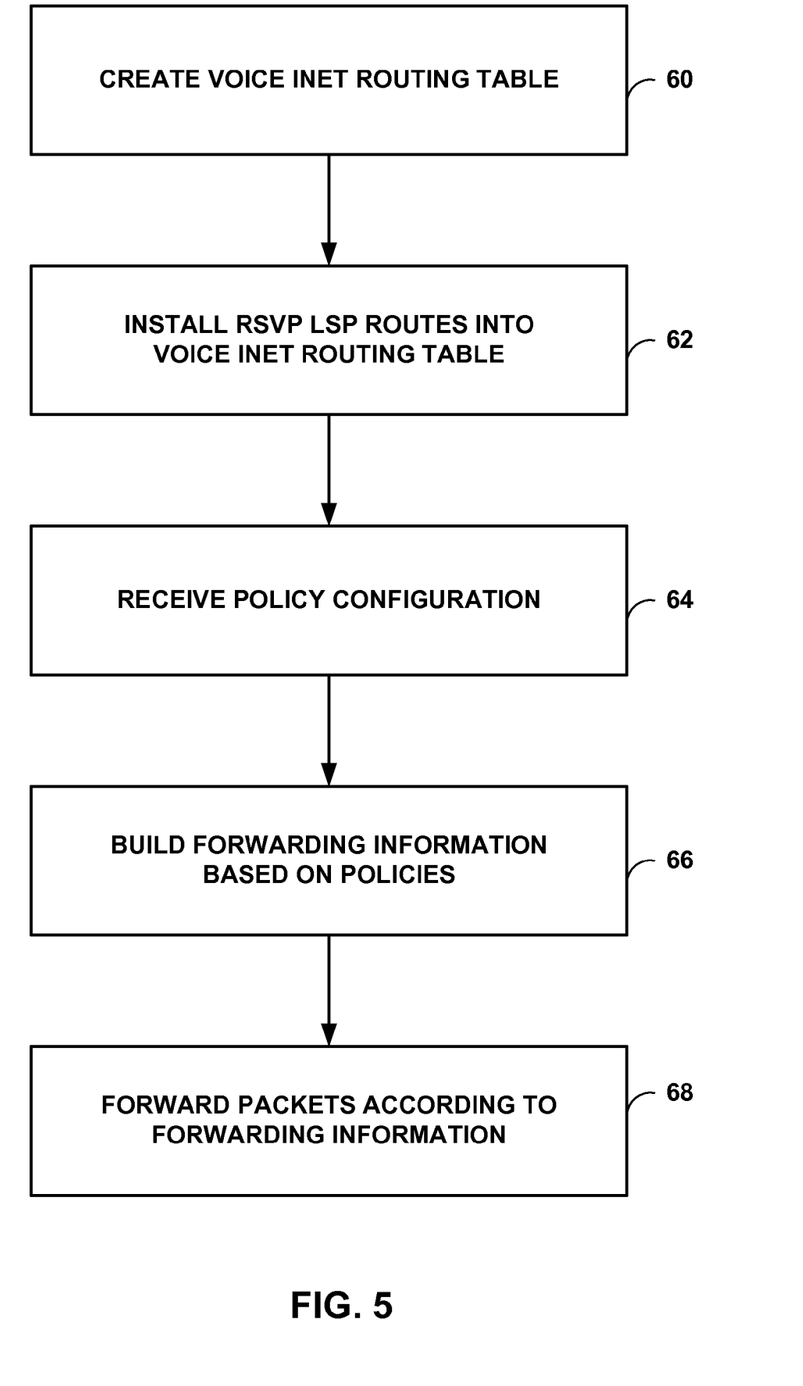
FIG. 5 is a flowchart illustrating example operation of the core router of FIG. 2 in creating indexed forwarding information and forwarding voice traffic and data traffic over different paths through the network.

FIG. 5 is a flowchart illustrating example operation of router 30 of FIG. 2 in creating forwarding information 45 that is indexed by forwarding class, and forwarding voice traffic and data traffic over different paths through network 18. LDP 46B creates voice inet table 44A within routing information 44 (60). LDP 46B installs RSVP LSP routes into voice inet table 44A (62). LDP 46B also installs all LDP routes received over the RSVP-LSP tunnel in voice inet table 44A. Control unit 48 receives policy configuration by the system administrator via user interface 48 (64). Router 30 builds forwarding information 45 according to policies 50, which may occur upon receiving MPLS packets carrying a particular EXP value for which forwarding entry has not yet been created (66). As discussed, router 30 then applies the matching one of policies 50 to select the appropriate route information from either voice inet table 44A or data inet table 44B. Router 30 forwards packets in accordance with forwarding information 45 (68). Router 30 uses the MPLS label and the EXP bits contained within the MPLS header to traverse forwarding information 45 to determine the appropriate next hop to which to forward the packet. Using the indexed forwarding information 45, in the case of a voice packet, router 30 will forward the packet on an RSVP LSP in accordance with forwarding information build from routing information within voice inet table 44A; in the case of a data packet, router 30 will forward the packet on an LDP LSP in accordance with forwarding information build from routing information within data inet table 44B. For voice traffic, if there is no RSVP LSP available in voice inet table 44A, the voice traffic may be dropped.

Various embodiments of the invention have been described. Although described for purposes of example in terms of forwarding voice traffic and data traffic on different paths throughout a network, the techniques may be applied for forwarding traffic of any type of different services based on the EXP bits of packets. Moreover, the techniques may be applied in environments that make use of protocols other than LDP and RSVP. These and other embodiments are within the scope of the following claims.

The invention claimed is:
1. A method comprising:
   with a router, building forwarding information for forwarding packets along a Multiprotocol Label Switching (MPLS) label switched path (LSP) of a first type, wherein the router is an intermediate router on the LSP of the first type positioned between an ingress router and an egress router of the LSP of the first type;

with the router, building forwarding information for forwarding packets along an MPLS LSP of a second type, wherein the router is an ingress router of the LSP of the second type;

receiving the packets on the LSP of the first type at the router, wherein the packets include MPLS labels having a label value that corresponds to the LSP of the first type, and wherein each of the MPLS packets includes MPLS Experimental (EXP) bits that have been defined to identify a class of service to which a respective packet belongs;

for each of the packets, accessing the forwarding information at the router to determine whether to forward the packet along the LSP of the first type or to forward the packet along the LSP of the second type based on (1) an MPLS label of the packet and (2) the class of service specified in an EXP bit of the packet;

determining whether the forwarding information includes an entry corresponding to both: (1) the label value corresponding to the MPLS LSP from which the packet was received, and (2) the class of service specified by the EXP bits;

when no entry exists, accessing routing information maintained by the router for the specified class of service and dynamically updating the forwarding information based on the routing information to include an entry that maps the label value corresponding to the MPLS LSP and the specified class of service to the LSP of the second type;

from the router, forwarding packets associated with a first class of service along the LSP of the first type in accordance with the forwarding information; and from the router, forwarding packets associated with a second class of service along the LSP of the second type in accordance with the forwarding information.

2. The method of claim 1, wherein the LSP of the first type conforms to a first protocol, and the LSP of the second type conforms to a second protocol that is different from the first protocol.

3. The method of claim 2, wherein the LSP of the first type conforms to a label distribution protocol (LDP) and the LSP of the second type conforms to a Resource Reservation Protocol (RSVP).

4. The method of claim 1, further comprising:
receiving policies from a system administrator via a user interface,
wherein accessing the forwarding information comprises applying the policies so as to index into the forwarding information to select a forwarding entry, wherein the index is responsive to the label value in combination with the EXP bits.

5. The method of claim 1, further comprising:
maintaining a first routing table with a set of routes associated with LSPs that conform to a first type of protocol; and
maintaining a second routing table with a set of routes associated with LSPs that conform to a second type of protocol.

6. The method of claim 5,
wherein building the forwarding information comprises applying policies that associate a best-effort class of service with the first routing table, and an expedited-forwarding class of service with the second routing table.

7. The method of claim 1,
wherein the classes of service include a best-effort class of service and an expedited-forwarding class of service, and
wherein the best-effort class of service comprises data traffic, and wherein the expedited-forwarding class of service comprises voice traffic.

8. A router comprising:
a control unit that builds forwarding information for forwarding packets along a Multiprotocol Label Switching (MPLS) label switched path (LSP) of a first type, wherein the router is an intermediate router on the LSP of the first type positioned between an ingress router and an egress router of the LSP of the first type,
wherein the control unit builds forwarding information for forwarding packets along an MPLS LSP of a second type, wherein the router is an ingress router of the LSP of the second type; and
an interface for receiving the packets on the LSP of the first type, wherein the packets include MPLS labels having a label value that corresponds to the LSP of the first type, and wherein each of the MPLS packets includes MPLS Experimental (EXP) bits that have been defined to identify a class of service to which a respective packet belongs; and
wherein the control unit, for each of the packets, accesses the forwarding information to determine whether to forward the packet along the LSP of the first type or to forward the packet along the LSP of the second type based on (1) an MPLS label of the packet and (2) the class of service specified in an EXP bit of the packet,
wherein, upon receiving each of the packets, the control unit determines whether the forwarding information includes an entry corresponding to both: (1) the label value corresponding to the MPLS LSP from which the packet was received, and (2) the class of service specified by the EXP bits of the packet,
wherein, when no entry exists, the control unit accesses routing information for the specified class of service and dynamically updates the forwarding information based on the routing information to include an entry that maps the label value corresponding to the MPLS LSP and the specified class of service to the LSP of the second type,
wherein the control unit forwards packets associated with a first class of service along the LSP of the first type in accordance with the forwarding information; and
wherein the control unit forwards packets associated with a second class of service along the LSP of the second type in accordance with the forwarding information.

9. The router of claim 8, further comprising:
a policies data structure that stores policies that associate a type of next hop with a class of service,
wherein the control unit dynamically builds the forwarding information by applying the policies.

10. The router of claim 9, further comprising a user interface for receiving the policies from a system administrator.

11. The router of claim 9, wherein the router is a core router of a network.

12. The router of claim 8, wherein the LSP of the first type conforms to a first protocol, and the LSP of the second type conforms to a second protocol that is different from the first protocol.

13. The router of claim 12, wherein the LSP of the first type conforms to a label distribution protocol (LDP) and the LSP of the second type conforms to a Resource Reservation Protocol (RSVP).

14. The router of claim 8, further comprising:
a first routing table with a set of routes associated with LSPs that conform to a first type of protocol; and
a second routing table with a set of routes associated with LSPs that conform to a second type of protocol.

15. The router of claim 14, wherein the control unit dynamically builds the forwarding information by applying policies that associate a first class of service with the first routing table and a second class of service with the second routing table.

16. The router of claim 14, wherein the set of routes of the first type comprises a set of Resource Reservation Protocol (RSVP) LSPs, and wherein the set of routes of the second type comprises a set of label distribution protocol (LDP) LSPs.

17. The router of claim 8, wherein the control unit dynamically builds the forwarding information by applying a policy that associates Resource Reservation Protocol (RSVP) LSPs with an expedited-forwarding class of service and associates label distribution protocol (LDP) LSPs with a best-effort class of service.

18. The router of claim 8, wherein the classes of service include a best-effort class of service and an expedited-forwarding class of service.

19. The router of claim 18, wherein the best-effort class of service comprises data traffic, and wherein the expedited-forwarding class of service comprises voice traffic.

20. A non-transitory computer-readable storage medium comprising program instructions for causing a router to:
build forwarding information for forwarding packets along a Multiprotocol Label Switching (MPLS) label switched path (LSP) of a first type, wherein the router is an intermediate router on the LSP of the first type positioned between an ingress router and an egress router of the LSP of the first type;
build forwarding information for forwarding packets along an MPLS LSP of a second type, wherein the router is an ingress router of the LSP of the second type;
receiving the packets on the LSP of the first type at the router, wherein the packets include MPLS labels having a label value that corresponds to the LSP of the first type, and wherein each of the MPLS packets includes MPLS Experimental (EXP) bits that have been defined to identify a class of service to which a respective packet belongs;
for each of the packets, access the forwarding information at the router to determine whether to forward the packet along the LSP of the first type or to forward the packet along the LSP of the second type based on (1) an MPLS label of the packet and (2) the class of service specified in an EXP bit of the packet;
access the forwarding information to determine whether the forwarding information includes an entry corresponding to both: (1) the label value corresponding to the MPLS LSP from which the packet was received, and (2) the class of service specified by the EXP bits;
when no such entry exists, access routing information maintained by the router for the specified class of service, and dynamically update the forwarding information based on the routing information to include an entry that maps the label value corresponding to the MPLS LSP and the specified class of service to the LSP of the second type;
forward packets associated with a first class of service along the LSP of the first type in accordance with the forwarding information; and
forward packets associated with a second class of service along the LSP of the second type in accordance with the forwarding information.

21. The computer-readable medium of claim 20,
wherein the instructions to forward the packets comprise instructions to forward the packets from the router to the next hops in accordance with the forwarding information by:
(i) forwarding along the LSP of the first type a first subset of the packets in which the EXP bits specify a first class of service, and
(ii) redirecting to the LSP of the second type a second subset of the packets in which the EXP bits specify a second class of service.

22. The computer-readable medium of claim 20, wherein the classes of service include a best-effort class of service and an expedited-forwarding class of service, and wherein the best-effort class of service comprises data traffic and the expedited-forwarding class of service comprises voice traffic.

* * * * *